Aug. 26, 1958  Z. GOGLANIAN  2,848,788
TOOL HOLDER

Filed Aug. 2, 1954  4 Sheets-Sheet 1

Inventor
Zohrab Goglanian
By Schroder, Hoffman, Brady & Wegner
Attorneys

Aug. 26, 1958 Z. GOGLANIAN 2,848,788
TOOL HOLDER
Filed Aug. 2, 1954 4 Sheets-Sheet 2
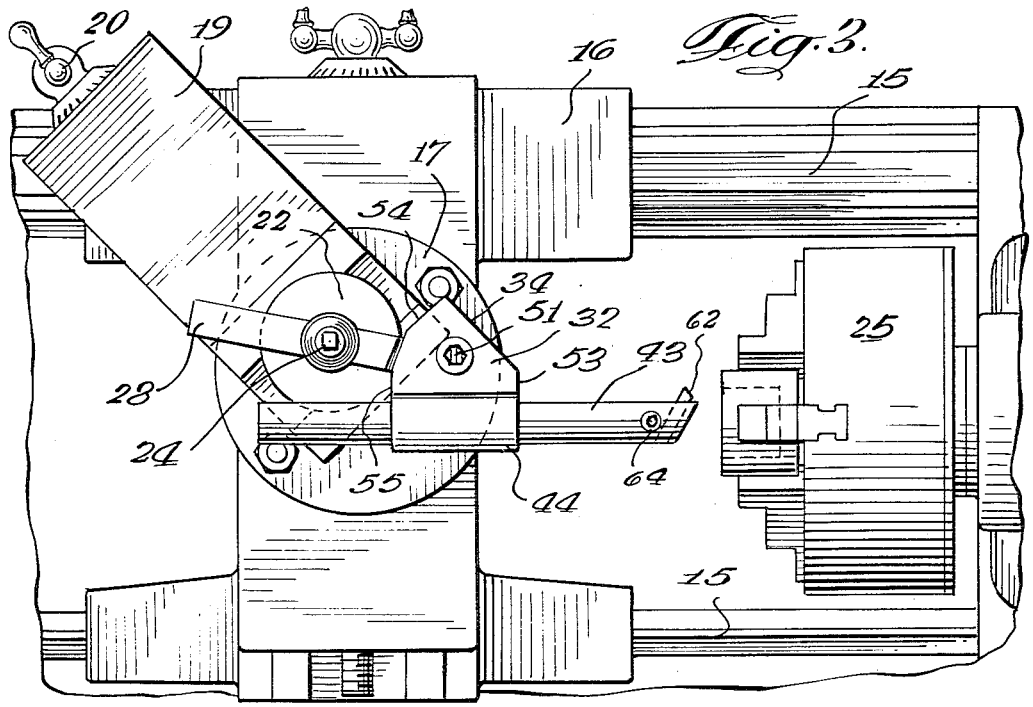
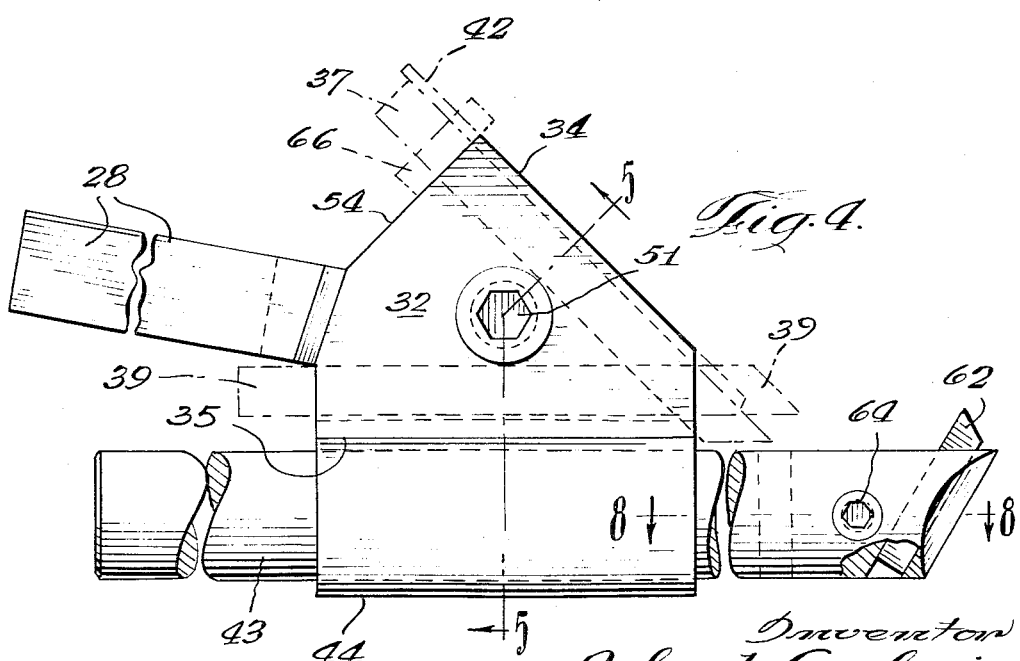
Inventor
Zohrab Goglanian
By Schroeder, Hofgren, Brady & Lowery
Attorneys Aug. 26, 1958
Z. GOGLANIAN
2,848,788
TOOL HOLDER
Filed Aug. 2, 1954
4 Sheets-Sheet 3
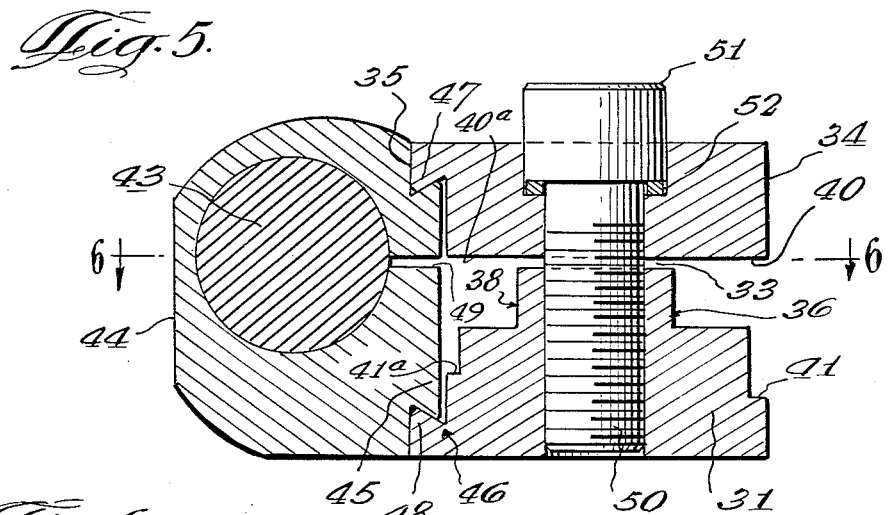
Fig. 5.
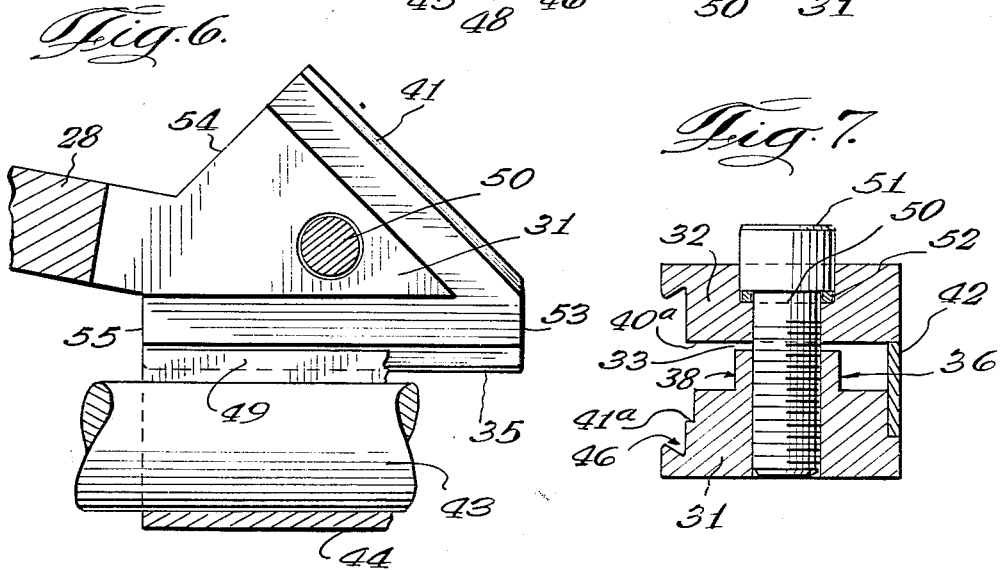
Fig. 6.
Fig. 7.
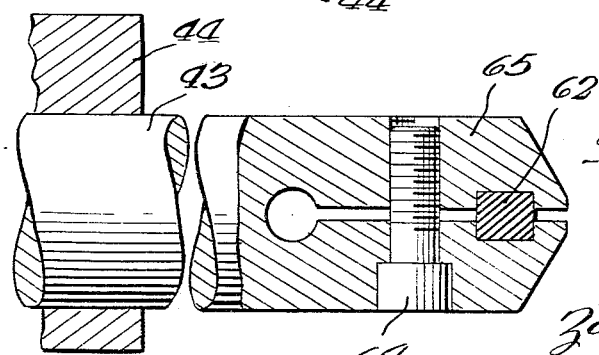
Fig. 8.
Inventor
Zohrab Goglanian
By Schroeder, Hofgren, Brady & Wegner
Attorneys

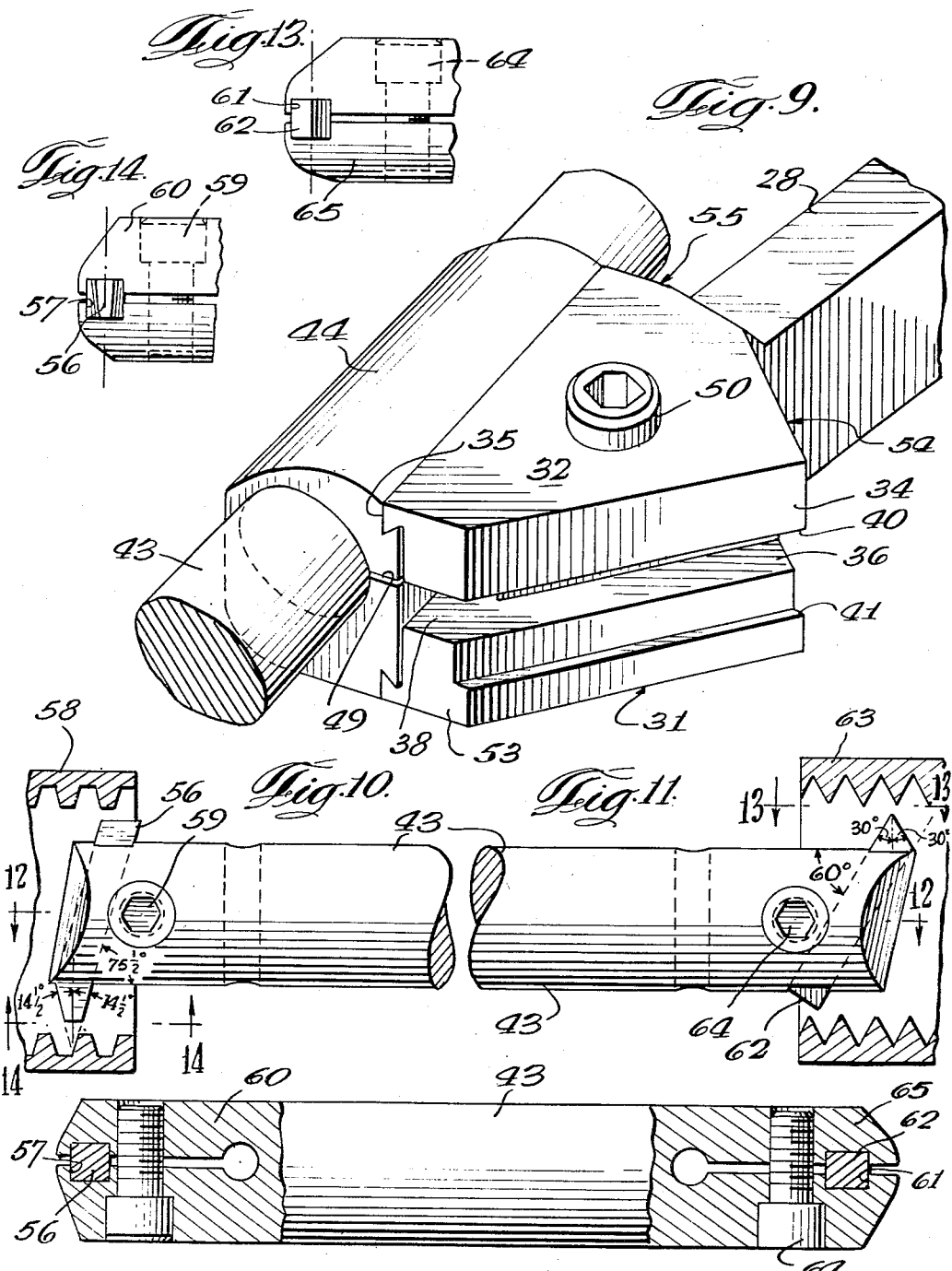

United States Patent Office 2,848,788
Patented Aug. 26, 1958

2,848,788
TOOL HOLDER

Zohrab Goglanian, Morton Grove, Ill.

Application August 2, 1954, Serial No. 447,340

1 Claim. (Cl. 29—96)

This invention relates to a tool holder and more particularly to a lathe tool holder for interchangeably receiving various tools, each properly centered without disturbing the setting of the holder.

In the operation of an engine lathe, particularly for job lot or other small production, there is often the need to change frequently the particular tool bit to substitute another or a cutting tool of a different type. Ordinarily, a new work piece is formed in certain set schemes of operations, each requiring a particular tool. In the past, considerable time was lost in the taking out of one tool holder with one type of tool and the insertion of another tool holder with a different tool in the compound support of the lathe. The present invention obviates the past difficulties in the provision of a tool holder that may be properly positioned in a given lathe to center each and every tool that may thereafter be placed in the holder. The holder need not be removed from the tool post once it is so positioned. Obviously, a considerable savings in time may thus be effected.

It is therefore the principal object of this invention to provide a new and improved tool holder of the character described.

Another object is to provide a tool holder requiring but a single centering operation on a given lathe to position properly all tools thereafter placed in the holder.

Another object is to provide a tool holder having a simple clamping arrangement serving to fasten on both tool bits and other tool members having cylindrical shanks in proper position for operation in the lathe.

Another object is the provision of an improved tool holder having sides set at an angle to each other for speeding the set up of various cutting tools in a lathe operation.

Another object is to provide a tool holder with an improved support for a boring bar or similar tools having cylindrical shanks.

Other features, objects and advantages of the present invention will be apparent from the following description of a preferred embodiment of the invention illustrated in the accompanying drawings, in which:

Figure 3 is a fragmentary top plan view of a portion of a lathe having the tool holder of this invention therein in position to support a boring bar;

Figure 4 is a fragmentary enlarged top plan view of the tool holder and boring bar illustrated in Figure 3;

Figure 5 is a sectional view through the holder and boring bar taken substantially along line 5—5 in Figure 4;

Figure 6 is a fragmentary horizontal sectional view through the holder and boring bar taken substantially along line 6—6 in Figure 5;

Figure 7 is a view similar to Figure 5 showing a cut-off tool in position in the holder;

Figure 8 is a fragmentary sectional view through the boring bar taken substantially along line 8—8 in Figure 4;

Figure 9 is a fragmentary perspective view of the holder and boring bar;

Figure 10 is a fragmentary horizontal plan view partly in section of an end of the boring bar equipped with a particular thread cutter;

Figure 11 is a view similar to Figure 10 showing a different thread cutter;

Figure 12 is a side elevational view of a boring bar partly in section taken substantially along line 12—12 in Figures 10 and 11;

Figure 13 is a fragmentary elevational sectional view taken substantially along line 13—13 in Figure 11; and Figure 14 is a sectional fragmentary elevational view taken substantially along line 14—14 in Figure 10.

Figure 1:
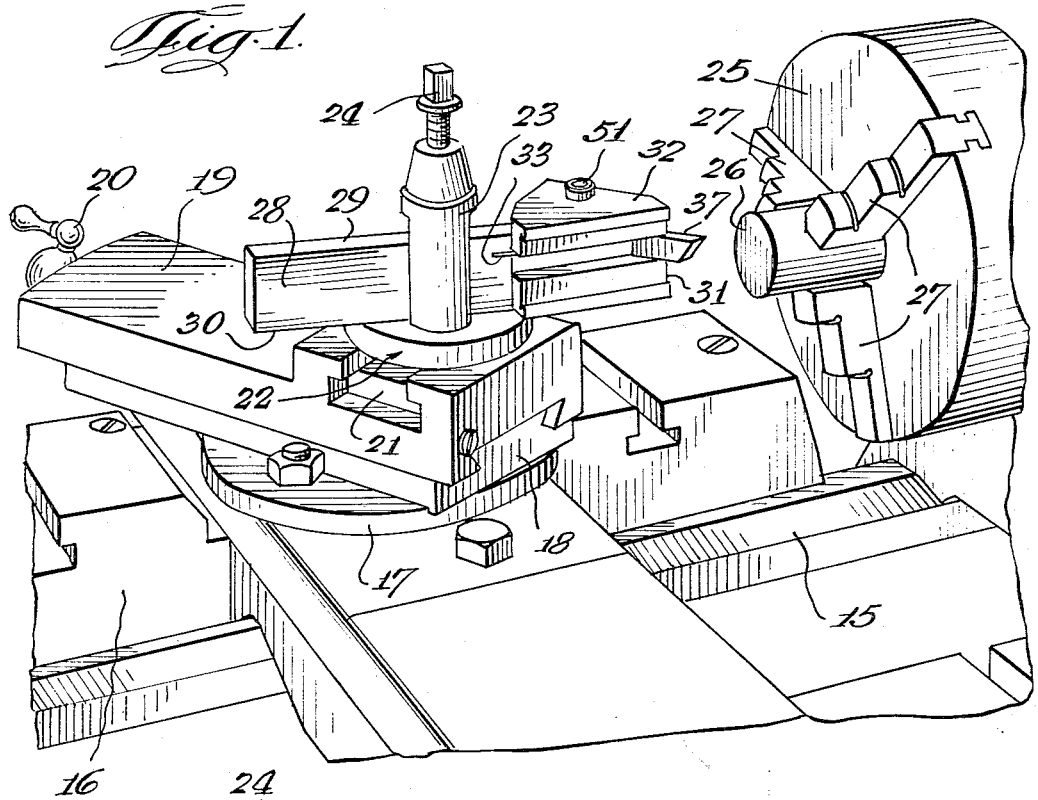
Figure 1 is a fragmentary perspective view of a portion of a lathe including the carriage, chuck and the tool holder of this invention.

The tool holder of the present invention is intended for use with the usual type of engine lathe. As illustrated in Figure 1, the ways 15 of the lathe bed support a carriage 16 slidingly thereon. The carriage, in turn, has a plate 17 upon which is mounted the bottom slide 18 of the cross slide member 19 movable by means of the handle 20 in the usual manner. A tool slide 21 is movable transversely of the cross slide and supports a compound support 22 including a tool post 23 which may be tightened upon a tool holder by threaded fastener 24. This structure is usual and standard on most engine lathes. Other complicated tool supports are utilized in many instances, however, the present invention relates to a tool holder which may be used with the standard type of compound support illustrated.

The chuck 25 may support a work piece 26 by means of a plurality of jaws 27 in the usual manner so that the work piece is centered on the axis of rotation of the chuck. The tail stock of the lathe is not shown as it forms no part of the invention. The tool holder may be used with work supported solely by the chuck or work supported between the chuck and the tail stock.

The tool holder of the present invention includes a shank 28 of usual form in that it has generally parallel upper 29 and lower 30 surfaces and is generally rectangular in section. The shank is insertable into the tool post 23 in the usual manner and is tightened into position by use of the screw fastener 24. A head is mounted on the shank and may be integral therewith. The particular head is composed of two parts, a lower portion 31 and an upper portion 32 formed either by splitting the solid head to provide a horizontal dividing slot 33 or by forming the head and shank of two portions secured together along the length of the shank. Either method of forming the split or divided head is satisfactory. All of the parts are carefully machined so that accuracy and strict tolerances are maintained.

The head is equipped to receive a plurality of tool bits and other tool members. The head is somewhat arrow-shaped in that one side 34 is positioned at an angle to the other side 35. The particular included angle illustrated is one of 45° although an angle of 60° may be provided. In other instances, any other desired angle may be utilized.

Figure 2:
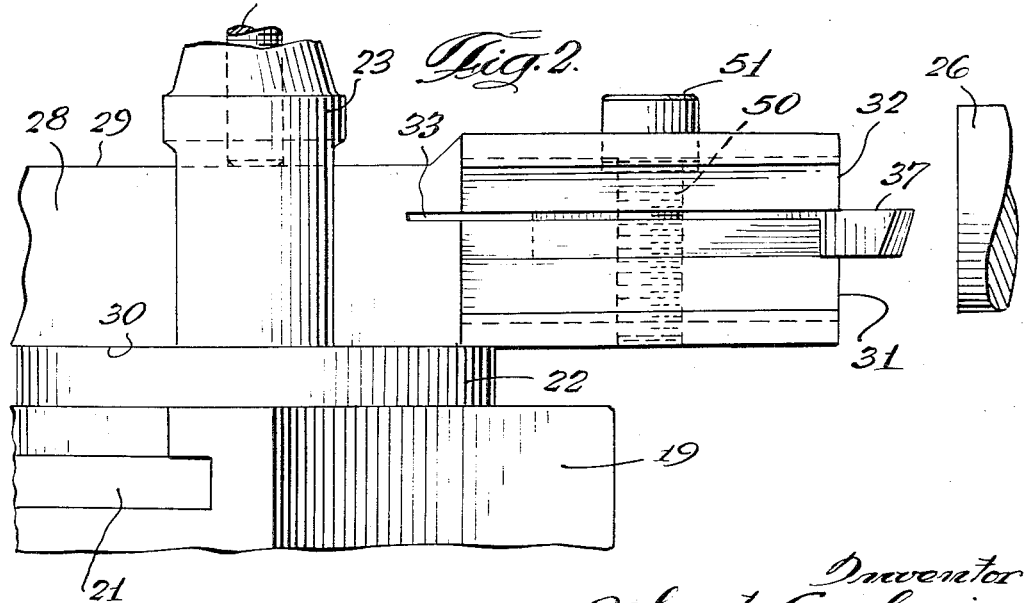
Figure 2 is a fragmentary side elevational view of the tool holder illustrated in Figure 1.

Square tool bits may be positioned in the head portions in channels provided for this purpose. As illustrated in Figure 5, a square channel 36 is provided parallel to the side 34 for receiving a tool cutting bit 37 as shown in Figures 1 and 2. A similar square channel 38 is formed parallel to the surface 35 to receive another tool bit 39 as illustrated in Figure 4. The upper surface of each of these square channels is the flat under surface of the upper portion of the head. They are thus in the same plane, which will be horizontal when the holder is placed in the tool post. This insures that any tool bit and particularly carbide bits placed in either channel will have its cutting tip in the same horizontal plane relative to the center line of the lathe chuck. While the channels are specified as square, it will be noted that they are open on the outer side to facilitate insertion of a tool bit from the side desired.

The side 34 of the holder is provided with a way having a portion 40 on the upper head portion and a cooperating portion 41 on the lower head portion. A similar way having corresponding portions 40a and 41a is provided on the opposite side. These ways are provided to receive an ordinary cut-off tool 42 as illustrated in Figures 4 and 7. The way is so located relative to the square channels 36 and 38 that the cutting tip of the cut-off tool will be in the same plane common to the plane of the cutting tips of the tool bits 37 and 39. Relatively thick or thin cut-off tools may be placed in either of the ways.

The holder is also equipped to support a new and improved boring bar attaching sleeve as illustrated in Figures 3–6. A cylindrical boring bar 43 is held in a split sleeve 44 having a dovetailed base 45 to fit into a way 46 formed in the side 35 of the holder head. An upper portion 47 of the way is formed on the upper head portion and a cooperating portion 48 of the way is formed on the lower head portion. The sleeve is provided with a slot 49 extending along its length between the parts that are secured in the way.

Each of the tools and the sleeve 44 are secured in the head by the operation of a single fastening device. Herein this device is in the form of a screw 50 having an Allen wrench type head 51 and passing through the upper and lower head portions normal to the upper and lower surfaces. A washer is placed under the head of the screw in the upper head portion while the screw is threaded into the lower portion. Appropriate turning of the screw will draw the head portions tightly against any tool placed in one of the tool head receiving channels. The clamping action of the tool head portions accomplished by the screw 50 also clamps the sleeve 44 onto the boring bar 43. Thus, one clamping action is all that is required to secure any of the tools in the holder.

One particular advantage of the present holder is obtained by requiring but a single set up of the holder in the tool post permitting thereafter any changes of the cutting bits or other tools. One mode of obtaining the centering of the cutting tools so that each tool will thereafter be centered is to place the boring bar 43 in the chuck of the lathe, if it is concentric, and attach the sleeve 44 and holder in operative position. The elevation of the shank of the holder is thus determined in the post and the proper washer may be placed on the base of the compound support under the tool holder to secure the holder in this position. The center line of the boring bar and the cutting tips of each cutting tool placed in the holder are in a common horizontal plane which intersects the axis of the lathe chuck. Once set in position, the holder may be rotated in the tool post without affecting its elevation and thus not disturbing the centering procedure previously followed.

Should the chuck not be concentric, a bar may be placed in the chuck and turned down to the boring bar size. Thereafter, the previously described process is followed to locate the tool holder. If the lathe is equipped only with a collet, the boring bar may be placed in the collet to obtain the position of the tool holder as described.

The head of the holder is particularly shaped to provide ease of operation with various cutting tools. A face or nose 53 is perpendicular to the side 35 of the holder so that this face may be placed flush against the face of the chuck 25 and thus align the side 35 with the holder perpendicular to the chuck. The boring bar sleeve 44 may thus be attached to the holder and will hold the boring bar axis parallel to the chuck axis. Additionally, the back surface 54 of the holder is perpendicular to the square channel 36 and the side 34 of the holder head so that stops (such as 66, Fig. 4) may be secured to the tool bits permitting their reinsertion into the holder in the exact position they previously occupied. This is important in an operation where a tool bit must be removed for an intervening action with another tool after which the tool bit must be reinserted to continue a cutting operation. Similarly, the surface 55 on the back side of the holder is perpendicular to the square channel 38 and side 35 of the tool head for the same purpose. While the split sleeve 44 has been described as capable of holding a boring bar, it should be understood that other cylindrical tools or tools having cylindrical shanks may be utilized such as a drill or the shank of a small chuck for holding drills or other tools. In order to support tools with cylindrical shanks smaller than the cylindrical opening through the split sleeve 44, a split sleeve insert may be placed inside the split sleeve 44 to adjust the size of the bore to the shank. Additionally, a stop may be placed on the boring bar to relocate it relative to the sleeve 44 similarly to the procedure for relocating the tool bits in the holder.

An important advantage of the angular relation of the surfaces on the sides of the tool head is in the cutting of internal threads on a work piece held in the chuck. The boring bar herein utilized is shown as equipped with a pair of thread cutting bits, one in each end. Referring particularly to Figures 10–14, a thread cutting bit 56 is placed in a square bore 57 in the end of the boring bar positioned at an angle of 75½° to the axis of the bar. A 14½° angle is provided by grinding only one side of the bit so as to provide the proper pitch for the American Standard 29° stub or Acme thread, as illustrated on the work piece 58. The tool bit 56 is held in the boring bar by a screw fastener 59 passing through the split end 60 of the bar.

The opposite end of the boring bar is equipped with a bore 61 similar to the bore 57 but at an angle of 60° to the axis of the bar. Thus, a tool bit 62 may be placed therein and by simply grinding one side of the bit the necessary 30° pitch may be provided for cutting a thread of the American Standard 60° type in a work piece 63 as illustrated in Figure 11. A screw member 64 fastens the tool bit in the split end 65 of the boring bar. Thus, with the proper alignment of the axis of the boring bar with the axis of the chuck of the lathe, internal threads may be cut on the work piece with very little set up time required.

The provision of a tool head with sides 34 and 35 having an included angle of 60° between them permits the cutting of either left or right hand threads without changing the compound setting. With the boring bar in its holder and equipped with a bit for cutting internal threads, a similar bit may be placed in the channel 36 to cut external threads without changing the angular setting of the tool holder or having to loosen the compound at all. The change may be effected in the angle of the holder without changing the elevation of the holder so that with any particular included angle between the sides of the head all cutting tools will be maintained at the same elevation with their cutting tip centered on the work piece, yet the tool position can be readily and accurately changed between most-used positions at different angles, as represented by the angle between the faces of the holder. An extreme savings in set-up time is thus effected by the utilization of the present invention.

While I have shown and described a particular embodiment of my invention, it is to be understood that it is capable of many modifications. Changes, therefore, in the construction and arrangement may be made without departing from the spirit and scope of the invention as disclosed in the appended claim.

I claim:

A lathe tool holder for providing interchangeably a support for a plurality of tools without moving the holder in the lathe, comprising: an elongated shank for positioning the holder in a tool post; a head on the shank divided along its length into upper and lower portions, said head having upright sides arranged at an acute angle to each other and a plurality of different tool receiving channels parallel to each said side for holding different cutting tools, one of said head portions having a planar surface forming a common side for each of the tool receiving channels so as to hold one side of each tool in a common plane permitting cutting tips on the tools to be similarly positioned relative to the holder and lathe; a clamping member on the head for tightening the head portions on tools placed in said channels; and a flat surface on the extremity of said head arranged perpendicular to one of said sides of the holder for aiding alignment of the tool holder with a lathe work holder.

References Cited in the file of this patent

UNITED STATES PATENTS

| | | |
|---|---|---|
| 629,236 | Carr | July 18, 1899 |
| 790,479 | Carr | May 23, 1905 |
| 861,768 | Remsberg | July 30, 1907 |
| 963,746 | Colton | July 12, 1910 |
| 968,776 | Levett | Aug. 30, 1910 |
| 1,063,184 | Colton | June 3, 1913 |
| 1,108,733 | Franz | Aug. 25, 1914 |
| 1,323,092 | Palmer | Nov. 25, 1919 |
| 1,453,133 | Heinze | Apr. 24, 1923 |
| 1,575,314 | Bousquet | Mar. 2, 1926 |
| 1,677,143 | Lange | July 17, 1928 |
| 2,324,603 | Strobl | July 20, 1943 |
| 2,333,228 | Barrett | Nov. 2, 1943 |
| 2,527,871 | Bakewell | Oct. 31, 1950 |
| 2,533,254 | Whigam | Dec. 12, 1950 |

OTHER REFERENCES

Engineering Workshop Practice, vol. 1, pp. 316–317 (Div. 13).